US012566837B2

(12) United States Patent
Kim

(10) Patent No.: US 12,566,837 B2
(45) Date of Patent: Mar. 3, 2026

(54) MULTI-CHIP FOR PERFORMING CHIPLET SECURITY AUTHENTICATION AND METHOD OF MANUFACTURING THE SAME

(71) Applicant: SAMSUNG ELECTRONICS CO., LTD., Suwon-si (KR)

(72) Inventor: Hyungseuk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 18/615,307

(22) Filed: Mar. 25, 2024

(65) Prior Publication Data

US 2025/0068718 A1 Feb. 27, 2025

(30) Foreign Application Priority Data

Aug. 25, 2023 (KR) ......................... 10-2023-0112043

(51) Int. Cl.
| | |
|---|---|
| *G06F 21/44* | (2013.01) |
| *G06F 21/60* | (2013.01) |
| *G06F 21/71* | (2013.01) |
| *H04L 9/32* | (2006.01) |

(52) U.S. Cl.
CPC .......... *G06F 21/445* (2013.01); *G06F 21/602* (2013.01); *G06F 21/71* (2013.01); *H04L 9/3268* (2013.01)

(58) Field of Classification Search
None
See application file for complete search history.

(56) References Cited

U.S. PATENT DOCUMENTS

| | | | | |
|---|---|---|---|---|
| 9,230,112 | B1 * | 1/2016 | Peterson | ................. G06F 21/76 |
| 11,080,431 | B1 * | 8/2021 | Casto | ...................... G06F 21/76 |
| 12,081,216 | B1 * | 9/2024 | Kandele | .......... H03K 19/17768 |
| 2014/0245384 | A1 * | 8/2014 | Shieh | .................... H04L 9/0894 |
| | | | | 726/2 |
| 2015/0295920 | A1 | 10/2015 | Van Kerrebroeck et al. | |
| 2019/0014104 | A1 * | 1/2019 | Brands | ................ H04L 63/0853 |
| 2019/0052464 | A1 * | 2/2019 | Doliwa | ............... H04L 63/0807 |
| 2019/0377024 | A1 * | 12/2019 | Zortman | ............... H01L 23/544 |
| 2020/0311291 | A1 * | 10/2020 | Troia | .................... G06F 21/64 |
| 2021/0035923 | A1 * | 2/2021 | Schat | ..................... H01L 23/544 |
| 2021/0367792 | A1 | 11/2021 | Kim et al. | |
| 2022/0029838 | A1 * | 1/2022 | Bear | ...................... H04L 9/3278 |
| 2022/0043921 | A1 * | 2/2022 | Troia | ...................... G06F 21/64 |
| 2022/0116206 | A1 * | 4/2022 | Kehlet | ..................... G06F 7/586 |
| 2022/0413593 | A1 * | 12/2022 | Kakkireni | .............. G06F 1/324 |
| 2022/0417005 | A1 * | 12/2022 | Patel | ..................... H04L 9/0822 |
| 2023/0022507 | A1 | 1/2023 | Philippe et al. | |
| 2023/0032099 | A1 * | 2/2023 | Zheng | ....................... H04L 9/14 |
| 2023/0119361 | A1 * | 4/2023 | Chritz | ................... H04L 9/3268 |
| | | | | 713/171 |
| 2023/0155845 | A1 | 5/2023 | Marson et al. | |
| 2025/0061181 | A1 * | 2/2025 | Ragavan | ................. G06F 21/57 |

* cited by examiner

*Primary Examiner* — Michael Pyzocha
(74) *Attorney, Agent, or Firm* — Sughrue Mion, PLLC

(57) ABSTRACT

A method of manufacturing a multi-chip includes generating a first authentication certificate in a first die using a private key of the first die, verifying the first authentication certificate in a second die using a public key of the first die, generating a second authentication certificate in the second die using a private key of the second die, and verifying the second authentication certificate using a public key of the second die in a third die.

19 Claims, 18 Drawing Sheets

Connect first chip and second chip — S110

Perform authentication between first chip and second chip — S120

Test functions of second chip — S130

Connect second chip and third chip — S140

Perform authentication between second chip and third chip — S150

Test functions of third chip — S160

MULTI-CHIP FOR PERFORMING CHIPLET SECURITY AUTHENTICATION AND METHOD OF MANUFACTURING THE SAME

CROSS-REFERENCE TO RELATED APPLICATION(S)

This application claims benefit of priority to Korean Patent Application No. 10-2023-0112043 filed on Aug. 25, 2023 in the Korean Intellectual Property Office, the disclosure of which is incorporated herein by reference in its entirety.

BACKGROUND

Example embodiments of the present disclosure relate to a multi-chip for performing chiplet security authentication and a method of manufacturing the same.

Recently, there has been an increased concern about the risk of systems including spy chips which are vulnerable to hacking or data leaks. To prevent this risk, authentication of individual devices in a host device has been used. Using a conventional method, however, it may be difficult to identify whether a spy die is present among silicon dies in a package during the manufacturing of chiplets.

SUMMARY

An example embodiment of the present disclosure is to provide a multi-chip for performing chiplet security authentication and a method of manufacturing the same. In embodiments of the disclosure, the multi-chip facilitates chiplet authentication at the package level, as well as at the die level before the die is packaged into a complete semiconductor device.

According to an example embodiment of the present disclosure, a method of verifying authentication of a multi-chip including a first die, a second die, and a third die, may include generating a first authentication certificate in the first die using a private key of the first die; verifying the first authentication certificate in the second die based on a public key of the first die; generating a second authentication certificate in the second die based on a private key of the second die; and verifying the second authentication certificate based on a public key of the second die in a third die.

According to an example embodiment of the present disclosure, a method of verifying authentication of a multi-chip may include connecting a first chip storing a first private key to a second chip storing a first public key that is paired with the first private key; performing a first authentication operation between the first chip and the second chip by generating a first authentication certificate by signing with the first private key and verifying the first authentication certificate with the first public key; testing at least one function of the second chip; connecting the second chip storing a second private key to a third chip storing a second public key that is paired with the second private key; performing a second authentication operation between the second chip and the third chip by generating a second authentication certificate by signing with the second private key and verifying the second authentication certificate with the second public key; and testing at least one function of the third chip.

According to an example embodiment of the present disclosure, a multi-chip includes a first die; a second die disposed on the first die and configured to communicate with the first die through a first chiplet interface; a third die disposed on the second die and configured to communicate with the second die through a second chiplet interface, wherein the first die, the second die, and the third die are configured to perform an authentication operation using pairs of private keys and public keys that are stored in different dies among the first die, the second die, and the third die.

According to an example embodiment of the present disclosure, a storage device may include at least one non-volatile memory device; and a controller configured to control the at least one nonvolatile memory device, wherein the controller includes a first die configured to communicate with an external host device; and a second die configured to communicate with the first die through a chiplet interface and to control the at least one nonvolatile memory device, wherein the first die and the second die perform a mutual authentication operation by generating an authentication certificate with a private key and verifying the authentication certificate with a public key.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as follows with reference to the accompanying drawings.

A multi-chip and a method of manufacturing the same according to an example embodiment may provide die authentication in a chiplet. Here, each of the dies in the chiplet may include an authentication circuit configured to perform a mutual authentication function based on interactions or communications with other dies in the chiplet. Using the multi-chip and the method of manufacturing the same example embodiments, whether a die is fake may be verified even without a master die that represents a baseline or an ideal state of a die before any potential tempering or unauthorized modifications. The multi-chip and the method of manufacturing the same in the example embodiments may be implemented with an authentication request-response function and an algorithm for verification in the process of manufacturing a chiplet. The multi-chip enables an authentication by comparing states among multiple monitored dies without necessitating a comparison between the state of a monitored die and that of the master die.

Figure 1:
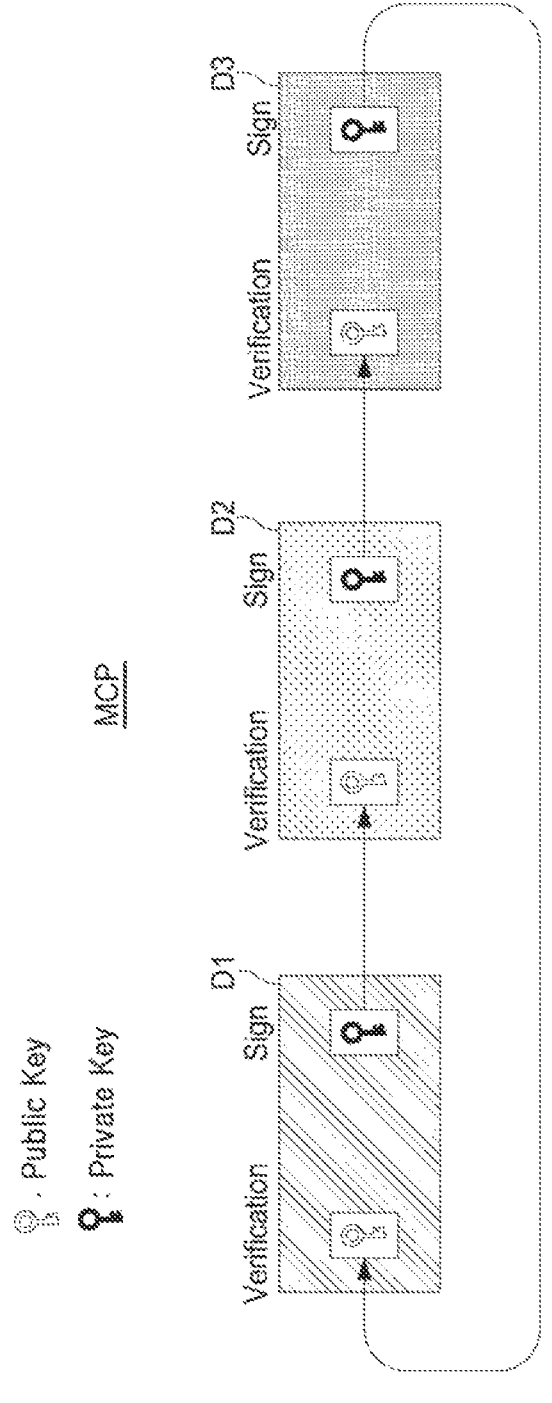
FIG. 1 is a diagram illustrating security authentication of multi-chip according to an example embodiment of the present disclosure.

FIG. 1 is a diagram illustrating security authentication of multi-chip MCP according to an example embodiment. Referring to FIG. 1, a multi-chip MCP may include a plurality of dies D1, D2, and D3. Each of dies D1, D2, and D3 may be configured to perform a bidirectional security authentication operation, that is, a mutual authentication operation. Authentication may occur in both directions between multiple dies (e.g., from a first die to a second die and from second die to third die) within a multi-chip, establishing a mutual or bidirectional trust between the multiple dies. In an example embodiment, each of dies D1, D2, and D3 may be implemented with a silicon die.

In an example embodiment, during a chiplet package assembly process, each of dies D1, D2, and D3 may perform authentication signing and verification with each other. For example, when manufacturing a multi-chip MCP, the mutual authentication operation may be performed as below. A first authentication certificate may be generated in the first die D1 using a private key of the first die D1. A first authentication certificate may be verified in the second die D2 using a public key of the first die D1. A second authentication certificate may be generated in the second die D2 using a private key of the second die D2. The second authentication certificate may be verified in the third die D3 using a public key of the second die D2. A third authentication certificate may be generated in the third die D3 using a private key of the third die D3. The third authentication certificate may be verified using a public key of the third die D3 in the first die D1.

During a wafer manufacturing process, a unique private key for each of dies D1, D2, and D3 and a public key for other dies included in the chiplet package may be entered/embedded. In an example embodiment, a private key and a public key may be stored in a read only memory (ROM) in the process of manufacturing a wafer. In another example embodiment, a private key and a public key may be stored in One-time programming memory (OTP) in a post-process. In an example embodiment, a key may be selected using a value generated based on ROM/OTP. Here, management of public keys and private keys may be performed by a multi-chip manufacturer (a server).

Figure 2A:
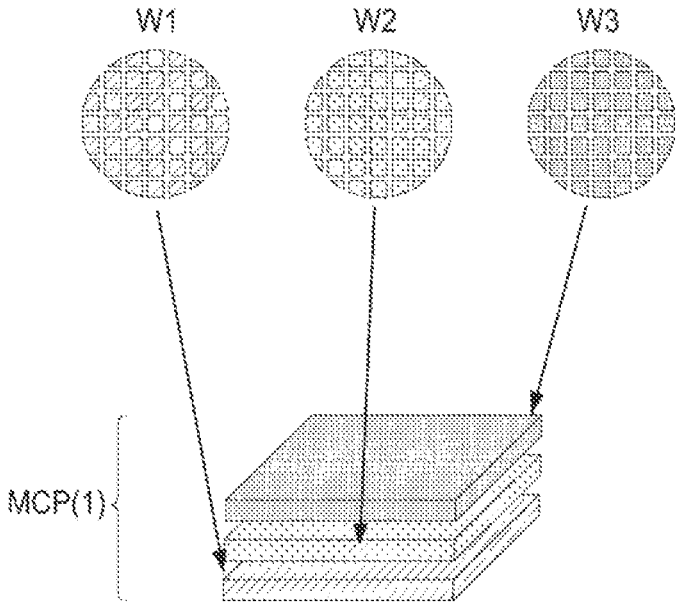
FIGS. 2A and 2B are diagrams illustrating a process of entering a private key and a public key in a process of manufacturing a multi-chip according to an example embodiment of the present disclosure.
Figure 2B:
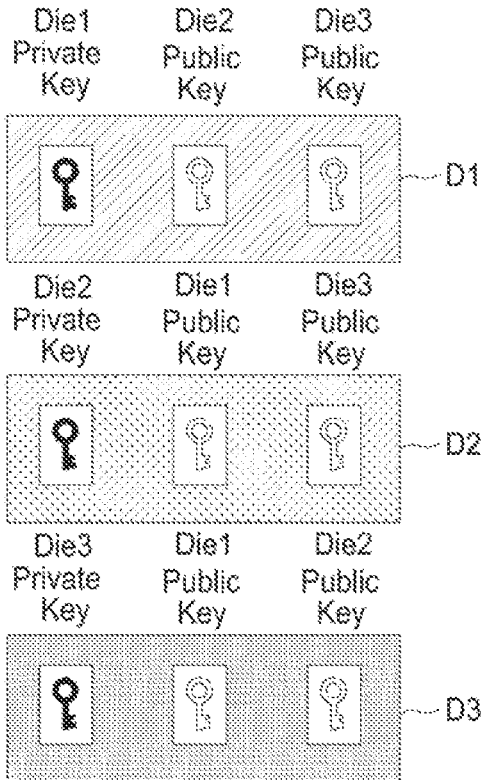

FIGS. 2A and 2B are diagrams illustrating a process of entering a private key and a public key in a process of manufacturing a multi-chip (MCP) 1 according to an example embodiment. As illustrated in FIG. 2A, multi-chip 1 may be implemented in a structure in which a first die D1, a second die D2, and a third die D3 are stacked. In an example embodiment, each of the first die D1, the second die D2, and the third die D3 may perform mutual authentication based interaction among multiple dies (e.g., the first die D1, the second die D2, and the third die D3). As illustrated in FIG. 2B, in the process of manufacturing a wafer, each private key and public keys of other dies included in the chiplet package may be entered. Each die may contain its own private key and the public keys of the other dies. For example, the first die D1 may store a private key of the first die D1 and public keys of the second and third dies D2 and D3. The second die D2 may store a private key of the second die D2 and public keys of the first and third dies D1 and D3. The third die D3 may store a private key of the third die D3 and public keys of the first and second dies D1 and D2.

In an example embodiment, each of the first die D1, the second die D2, and the third die D3 may store a private key of the corresponding die and a public key of at least one other die in a read only memory (ROM). In another example embodiment, each of the first die D1, the second die D2, and the third die D3 may store a private key of the corresponding die and a public key of at least one other die in a one-time programming memory (OTP) in a post-process.

In the description below, the process of performing security authentication while the multi-chip 1 is manufactured will be described. For example, a security authentication operation may be performed while dies are stacked.

Figure 3A:
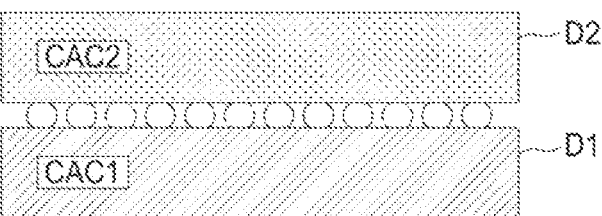
FIGS. 3A and 3B are diagrams illustrating an authentication operation when a second die is stacked on a first die according to an example embodiment of the present disclosure.
Figure 3B:
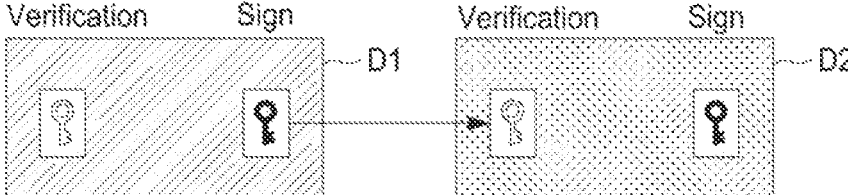

FIGS. 3A and 3B are diagrams illustrating an authentication operation when a second die D2 is stacked on a first die D1 according to an example embodiment. As illustrated in FIG. 3A, the second die D2 may be stacked on the first die D1. An authentication circuit CAC1 of the first die D1 may generate a signing value, that is, a first authentication certificate, using a private key of the first die D1. The authentication circuit CAC2 of the second die D2 may verify the first authentication certificate of the first die D1 using a public key of the first die D1. The above-described authentication operation may be performed in a conversed manner. The authentication circuit CAC2 of the second die D2 may sign using a private key of the second die D2, and the authentication circuit CAC1 of the first die D1 may verify the signing value of the second die D2 using a public key of the second die D2. Meanwhile, after the authentication operation, the first die D1 may conduct functional testing of the second die D2.

Figure 4A:
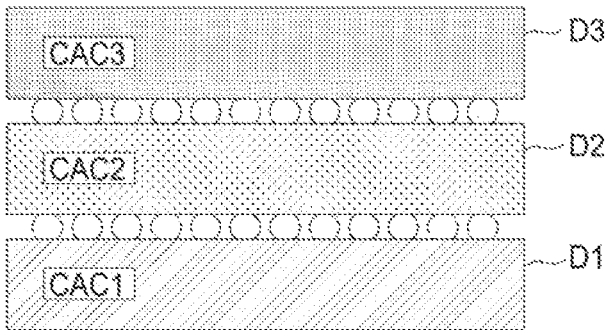
FIGS. 4A and 4B are diagrams illustrating an authentication operation when a third die is stacked on a second die according to an example embodiment of the present disclosure.
Figure 4B:
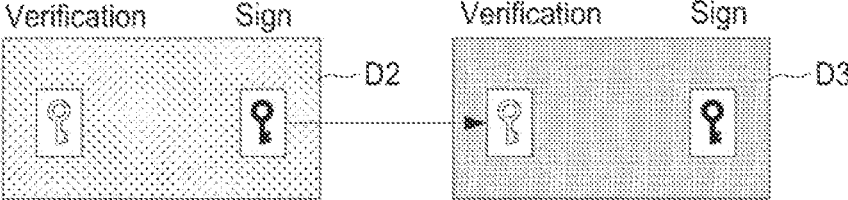

FIGS. 4A and 4B are diagrams illustrating an authentication operation when a third die D3 is stacked on a second die D2 according to an example embodiment. As illustrated in FIG. 4A, the third die D3 may be stacked on the second die D2. An authentication circuit CAC2 of the second die D2 may generate a signing value, that is, a second authentication certificate, using a private key of the second die D2. The authentication circuit CAC3 of the third die D3 may verify the second authentication certificate of the second die D2 using a public key of the second die D2. The above-described authentication operation may also be performed in a conversed manner. An authentication circuit CAC3 of the third die D3 may be signed using a private key of the third die D3, and the authentication circuit CAC2 of the second die D2 may verify a signing value of the third die D3 using a public key of the third die D3. After this authentication operation, the second die D2 may test functions of the third die D3.

Each of the authentication circuits CAC1, CAC2, and CAC3 may store a private key and a public key required to perform the authentication operation.

Figure 5:
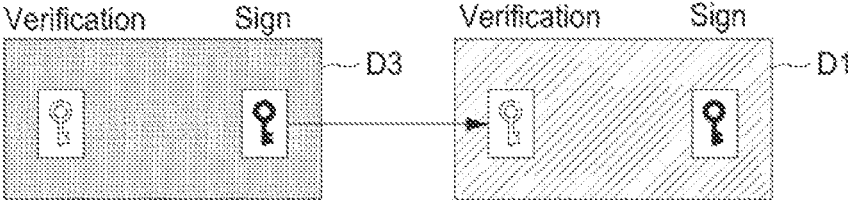
FIG. 5 is a diagram illustrating an authentication operation of a first die and a third die according to an example embodiment of the present disclosure.

FIG. 5 is a diagram illustrating an authentication operation of a first die D1 and a third die D3 according to an example embodiment. As illustrated in FIG. 5, an authentication circuit CAC3 of the third die D3 may generate a signing value, that is, a third authentication certificate, using a private key of the third die D3. The authentication circuit CAC1 of the first die D1 may verify the third authentication certificate of the third die D3 using a public key of the third die D3. The above-described authentication operation may also be performed in a conversed manner. The authentication circuit CAC1 of the first die D1 signs using a private key of the first die D1, and the authentication circuit CAC3 of the third die D3 may verify a signing value of the first die D1 using a public key of the first die D1. Meanwhile, after this authentication operation, the third die D3 may test functions of the first die.

As described above, a multi-chip according to an example embodiment may perform authentication based on interactions among multiple dies, each of which stores its own private key and the public key of at least one of the other dies. In FIGS. 3A to 5, the multi-chip 1 includes three dies D1, D2, and D3, such that the authentication procedure may be performed three times. However, the authentication order and the number of times the authentication is performed in the example embodiments are not limited thereto. The order of generating and verifying the signing value in the example embodiments may also be reversed.

In FIGS. 1 to 5, a multi-chip including three chiplets are illustrated, but the number of chiplets in the example embodiments is not limited thereto. The multi-chip including a k (an integer equal to or greater than 2) number of chiplets (or dies) may perform mutual authentication algorithms in the manufacturing process.

Figure 6:
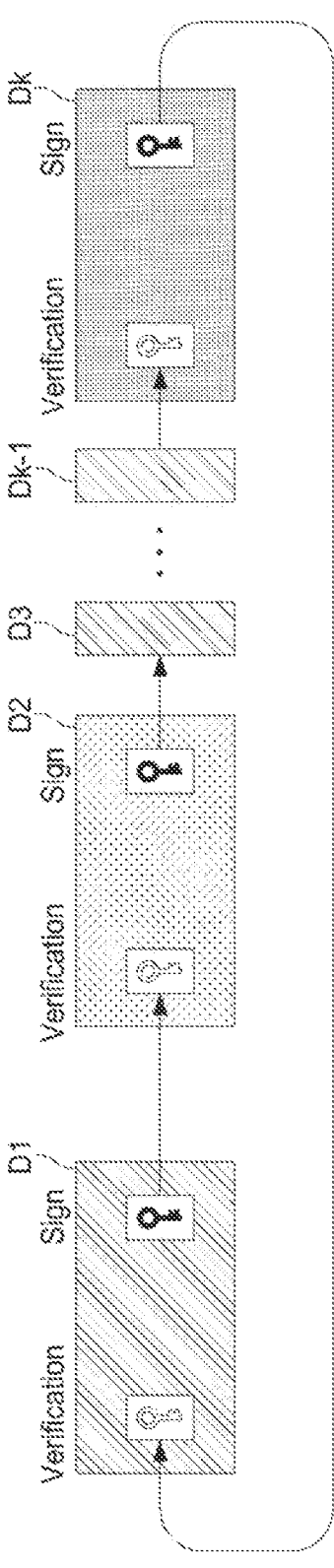
FIG. 6 is a diagram illustrating a process of performing security authentication on a multi-chip including k number of dies according to an example embodiment of the present disclosure.

FIG. 6 is a diagram illustrating a process of performing security authentication on a multi-chip including k number of dies according to an example embodiment. Referring to FIG. 6, when the second die D2 is mounted on the first die D1, the first die D1 may issue an authentication certificate using a private key. The second die D2 may receive an authentication certificate of the first die D1 and may verify the authentication certificate of the first die D1 using a public key of the first die D1. Thereafter, when the third die D3 is mounted on the second die D2, the second die D2 may issue an authentication certificate using a private key. The third die D3 may receive the authentication certificate of the second die D2 and may verify the authentication certificate of the second die D2 using a public key of the second die D2.

As described above, the issuing of authentication certificate and the verifying of authentication certificate may be performed repeatedly. When a kth die Dk is mounted on a k−1st die Dk−1, the k−1st die Dk−1 may issue an authentication certificate using a private key. The kth die Dk may receive an authentication certificate of the k−1st die Dk−1 and may verify the authentication certificate of the k−1st die D1 using a public key of k−1st die Dk−1. Lastly, the k-th die Dk may issue an authentication certificate using a private key. The first die D1 may receive the authentication certificate of the k-th die Dk and may verify the authentication certificate of the kth die D1 using a public key of the k-th die Dk. Accordingly, mutual authentication operation for the entirety of dies D1 to Dk included in the multi-chip may be completed.

The multi-chip according to an example embodiment may be implemented as a combination of a logic integrated circuit (IC), an analog IC, a memory, or a non-volatile memory (NVM).

Figure 7A:
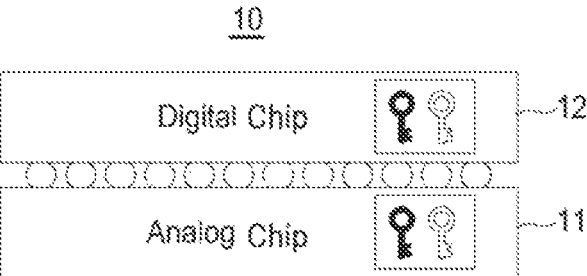
FIGS. 7A, 7B, and 7C are diagrams illustrating multi-chips according to various example embodiments of the present disclosure.
Figure 7B:
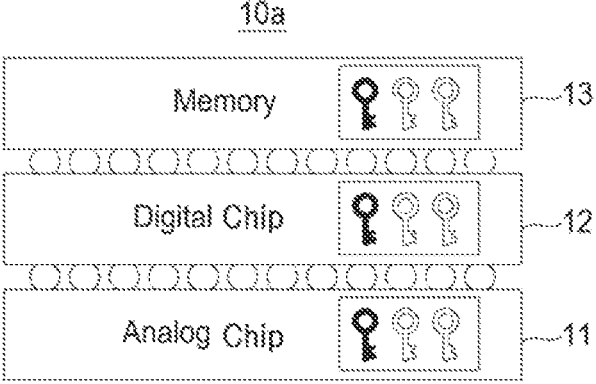
Figure 7C:
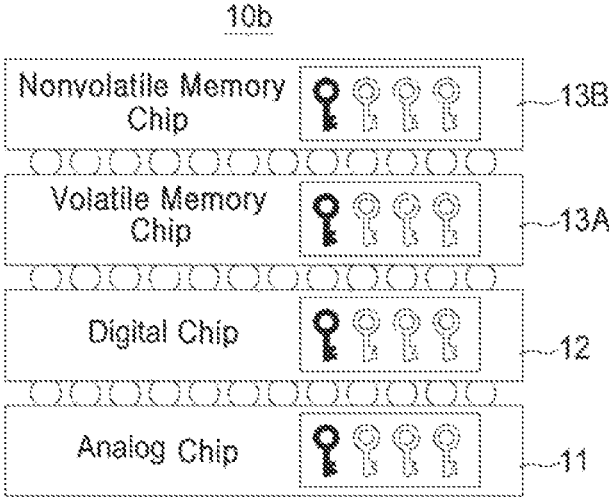

FIGS. 7A, 7B, and 7C are diagrams illustrating multi-chips according to various example embodiments.

Referring to FIG. 7A, a multi-chip 10 may include an analog chip 11 and a digital chip 12. As illustrated in FIG. 7A, the digital chip 12 may be disposed on the analog chip 11, which may incorporate analog input and output circuits. Meanwhile, the arrangement of the analog chip 11 and the digital chip 12 is not limited thereto.

Referring again to FIG. 7A, the analog chip 11 may store a private key of the analog chip 11 and a public key of the digital chip 12 to perform mutual authentication. The digital chip 12 may store a private key of the digital chip 12 and a public key of the analog chip 11 to perform mutual authentication. The private keys and public keys may be embedded in each chip during the process of manufacturing a die.

Referring to FIG. 7B, a multi-chip 10a may include an analog chip 11, a digital chip 12, and a memory chip 13. As illustrated in FIG. 7B, the digital chip 12 may be disposed on the analog chip 11, and the memory chip 13 may be disposed on the digital chip 12. Meanwhile, the arrangement of the analog chip 11, the digital chip 12, and the memory chip 13 is not limited thereto.

Referring back to FIG. 7B, the analog chip 11 may store a private key of the analog chip 11, a public key of the digital chip 12, and a public key of the memory chip 12 to perform mutual authentication. The digital chip 12 may store a private key of the digital chip 12, a public key of the analog chip 11, and a public key of the memory chip 13 to perform mutual authentication. The memory chip 13 may store a private key of the memory chip 13, a public key of the analog chip 11, and a public key of the digital chip 12 to perform mutual authentication.

Referring to FIG. 7C, a multi-chip 10b may include an analog chip 11, a digital chip 12, a volatile memory chip (e.g., Random Access Memory (RAM)) 13A, and a non-volatile memory chip (e.g., Read-Only Memory (ROM), flash memory, and hard disk drives) 13B. As illustrated in FIG. 7C, the digital chip 12 may be disposed on the analog chip 11, the volatile memory chip 13A may be disposed on the digital chip 12, and the nonvolatile memory chip 13B may be disposed on the memory chip 13. The arrangement of the analog chip 11, the digital chip 12, the volatile memory chip 13A, and the nonvolatile memory chip 13B is not limited thereto.

Referring again to FIG. 7C, the analog chip 11 may store a private key of the analog chip 11, a public key of the digital chip 12, and a public key of the memory chip 12 to perform mutual authentication. The digital chip 12 may store a private key of the digital chip 12, a public key of the analog chip 11, a public key of the volatile memory chip 13A, and a public key of the nonvolatile memory chip 14 to perform mutual authentication. The volatile memory chip 13A may store a private key of the volatile memory chip 13A, a public key of the analog chip 11, a public key of the digital chip 12, and a public key of the nonvolatile memory chip 13B to perform mutual authentication. The nonvolatile memory chip 13B may store a private key of the nonvolatile memory chip 13B, a public key of the analog chip 11, a public key of the digital chip 12, and a public key of the volatile memory chip 13A to perform mutual authentication.

Each of the chips included in the chiplet may perform mutual authentication.

Figure 8:
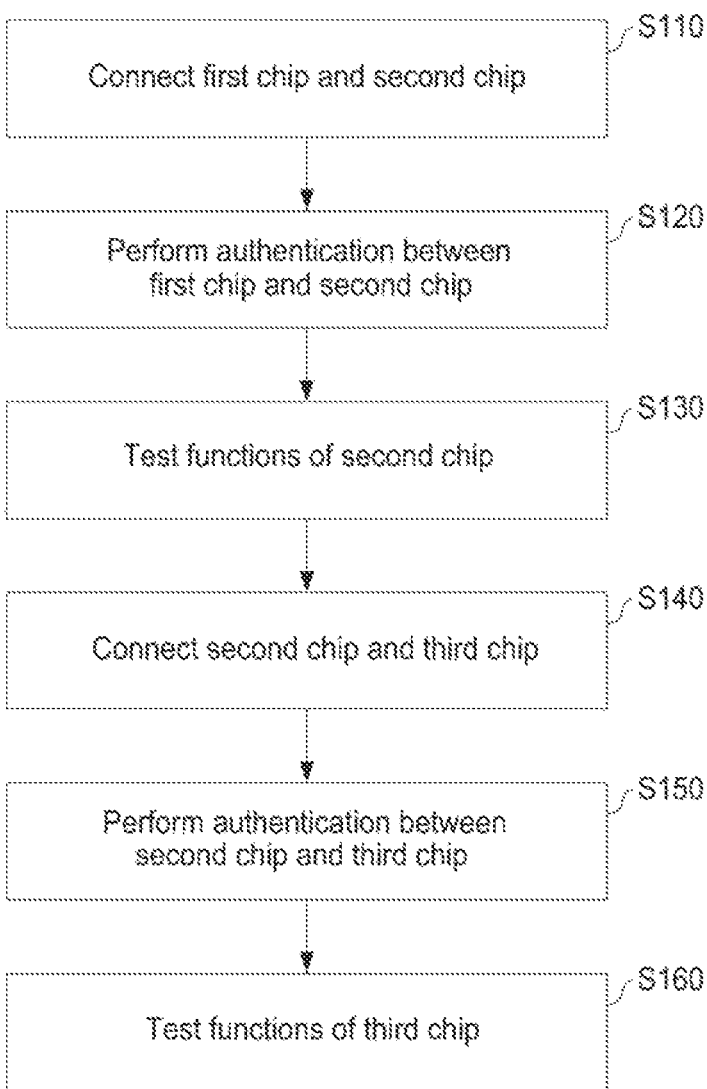
FIG. 8 is a flowchart illustrating an operation of manufacturing a multi-chip according to an example embodiment of the present disclosure.

FIG. 8 is a flowchart illustrating an operation of manufacturing a multi-chip according to an example embodiment. Referring to FIGS. 1 to 8, the operation of manufacturing a multi-chip may be performed.

The first chip and the second chip may be connected to each other (S110). An authentication operation may be performed between the first chip and the second chip (S120). Here, the authentication operation may be a mutual authentication operation. When the authentication verification is successful, a first test operation may be performed on functions for the second chip may be performed (S130). Here, the first test operation may be performed on the first chip. Thereafter, the third chip may be connected to the second chip (S140). The authentication operation may be performed between the second chip and the third chip (S150). When the authentication verification is successful, a second test operation may be performed on functions for the third chip may be performed (S160). Here, the second test operation may be performed on the first chip or the second chip.

In an example embodiment, each of the first chip, the second chip, and the third chip may include an authentication circuit configured to perform mutual authentication. In an example embodiment, the first chip may test functions of the second chip and the third chip. In another example embodiment, the first chip may test at least one function of the second chip, and the second chip may test at least one function of the third chip. In an example embodiment, each of the first chip, second chip, and the third chip may enter a corresponding private key and a public key of at least one other chip in the process of manufacturing a wafer.

The example embodiment may be applicable to a storage device having a storage controller implemented as a chiplet.

Figure 9:
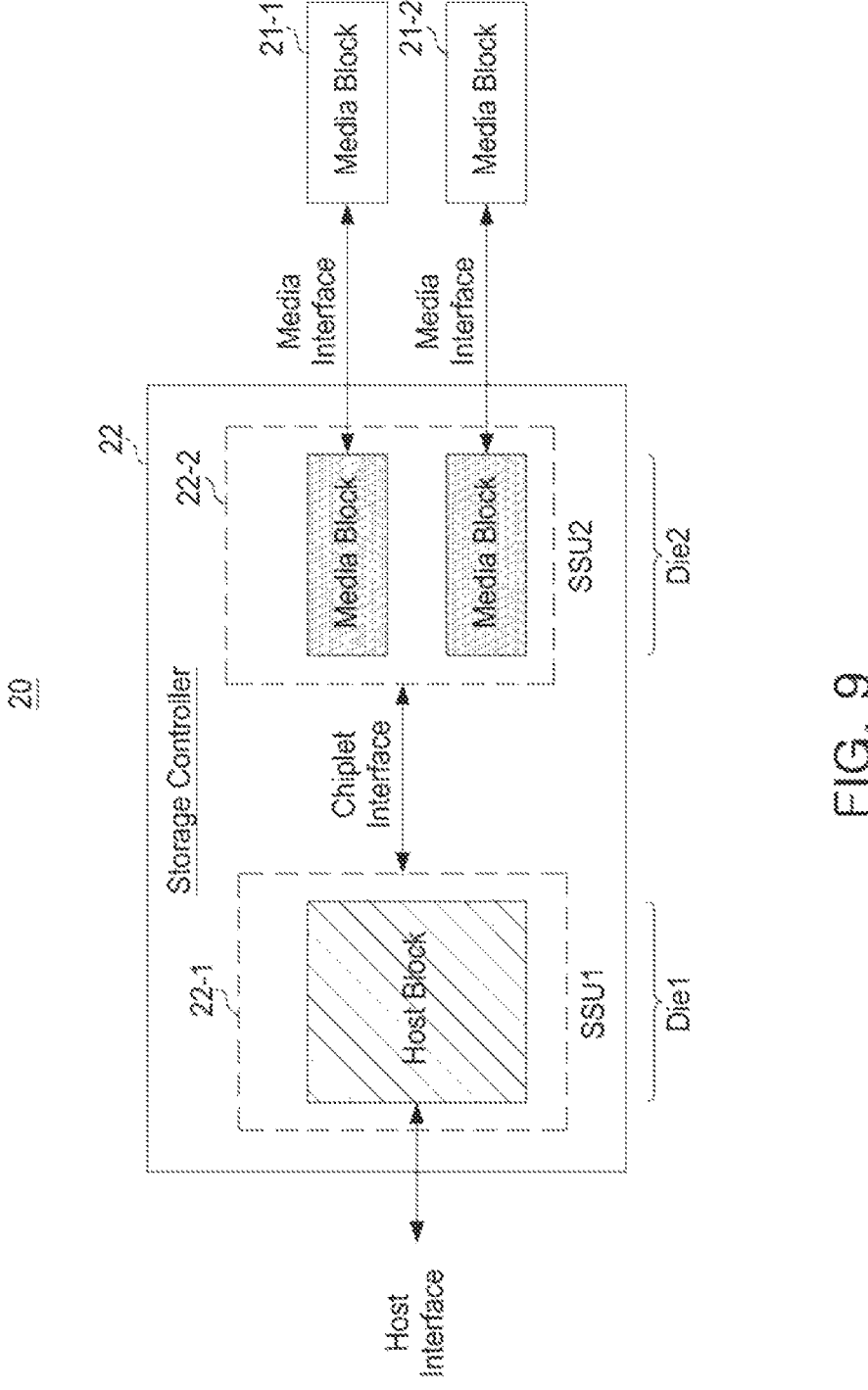
FIG. 9 is a diagram illustrating a storage device according to an example embodiment of the present disclosure.

FIG. 9 is a diagram illustrating a storage device 20 according to an example embodiment. Referring to FIG. 9, the storage device 20 may include a plurality of media blocks 21-1 and 21-2 and a storage controller 22 configured to control the blocks.

The storage controller 22 may include a first die SSU1 (22-1) and a second die SSU2 (22-2).

The first die SSU1 (22-1) may include a host block circuit. A host block circuit may be implemented to communicate with an external host device through a host interface. Here, the host interface may be implemented as an interface of a storage device such as peripheral component interconnect express (PCIe), non-volatile memory express (NVMe), serial attached SCSI (SAS), small computer system interface (SCSI), SCSIe, serial advanced technology attachment (SATA), SATAe, or computer express link (CXL).

The second die SSU2 (22-2) may include first and second media block circuits. Each of the first and second media block circuits may be implemented to communicate with the corresponding media block circuits 21-1 and 21-2 through a media interface. Here, the media interface may be an interface of a memory device such as a NAND interface, NOR interface, or the like.

Also, the first die 22-1 and the second die 22-2 may be connected to each other through a chiplet interface. In other words, the sub-silicon boards SSU1 and SSU2 of the storage controller 22 may communicate with each other according to the chiplet interface. In an example embodiment, the chiplet interface may include a universal chip interconnect express (UCIe) interface. Also, the first die 22-1 and the second die 22-2 may be implemented to perform a mutual authentication operation in the manufacturing process as described above and to perform a test operation.

Figure 10:
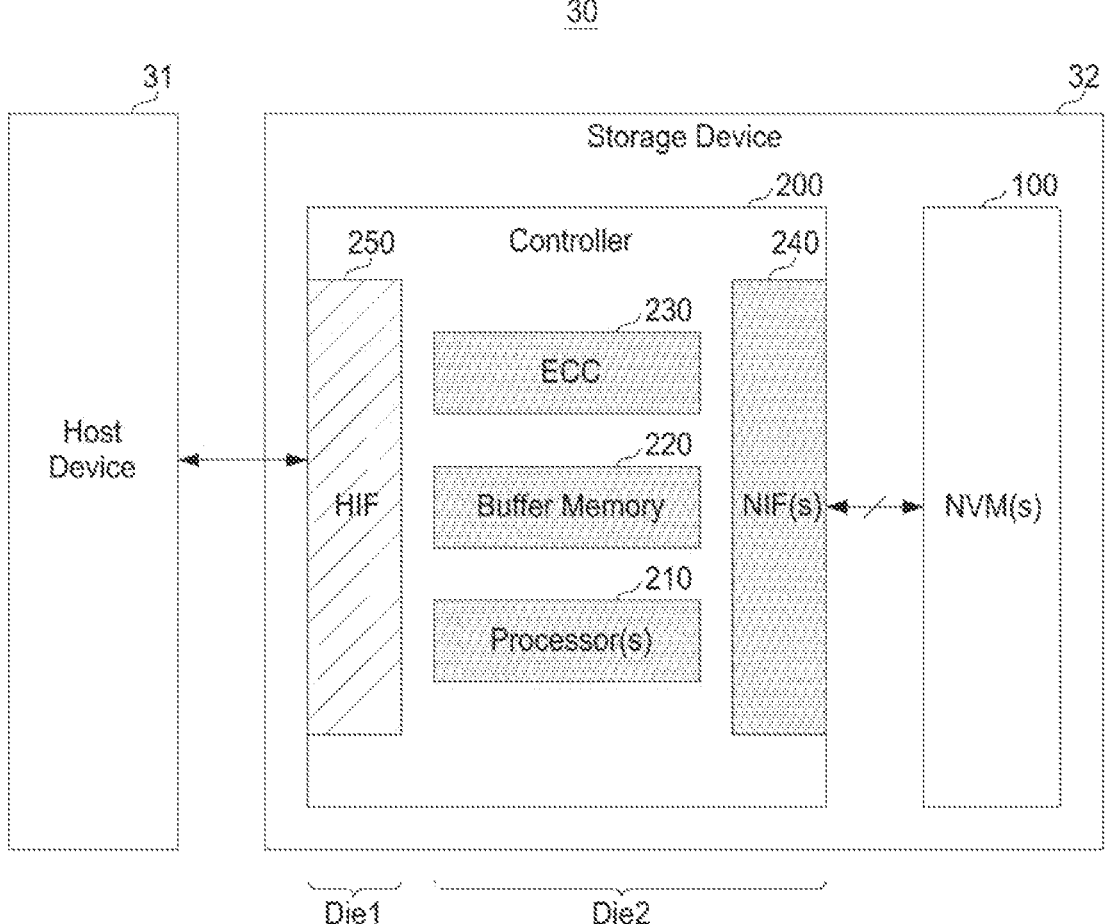
FIG. 10 is a diagram illustrating a host system according to an example embodiment of the present disclosure.

FIG. 10 is a diagram illustrating a host system 30 according to an example embodiment. Referring to FIG. 10, the host system 30 may include a host device 31 and a storage device 32.

The host system 30 may be implemented as a server computer, a personal computer (PC), a desktop computer, a lap-top computer, a workstation computer, a network-attached storage (NAS), a data center, an internet data center (IDC), or a mobile computing device. For example, the mobile computing device may be implemented as a smart phone, a tablet PC, or a mobile internet device (MID).

The host device 21 may be implemented to control a data processing operation (e.g., a write operation or a read operation) of the storage device 32. The host device 21 may include at least one of a central processing unit (CPU), a buffer memory, a memory device, a memory controller, and an interface circuit. The host device 21 may be implemented as an integrated circuit, a motherboard, or a system on chip. In example embodiments, the host device 21 may be implemented as an application processor or a mobile application processor.

The CPU may exchange commands or data with a buffer memory, a memory controller, and an interface circuit through a bus architecture. In an example embodiment, the bus architecture may be implemented as an advanced microcontroller bus architecture (AMBA), AMBA advanced extensible interface (AXI), AMBA advanced high-performance bus (AHB), or advanced interface bus (AIB). The buffer memory may store queues. In an example embodiment, the buffer memory may be implemented as a register or a static random access memory (SRAM). The queue may include a submission queue. The queue may store commands (e.g., a write command or a read command). In an example embodiment, the queue may further include a completion queue.

The memory device may be implemented as a volatile memory device or a nonvolatile memory device. Here, the volatile memory may be implemented as a random access memory (RAM), SRAM, or dynamic RAM DRAM. The nonvolatile memory may also be implemented as a NAND flash memory, NOR flash memory, phase change RAM (PRAM), magnetoresistive RAM (MRAM), spin-transfer torque magnetic random-access memory (STT-MRAM), ferroelectric RAM (FRAM) or resistive RAM (RRAM). The memory controller may write data to the memory device or may read stored data from the memory device under control of the CPU. In an example embodiment, the memory controller may include functions of a direct memory access (DMA) controller. The interface circuit may be connected to the host interface circuit 250 HIF of the storage device 32 through a predetermined host interface.

The storage device 32 may include at least one nonvolatile memory device (NVM(s), 100) and a controller 200. At least one nonvolatile memory device 100 may be implemented to store data. The nonvolatile memory device 100 may be implemented as a NAND flash memory, vertical NAND flash memory, NOR flash memory, resistive random access memory (RRAM), phase-change memory (PRAM), magnetoresistive random access memory (MRAM), ferroelectric random access memory (FRAM), and spin transfer torque random access memory (STT-RAM). Hereinafter, the nonvolatile memory device 100 will be referred to as a vertical NAND flash memory device for ease of description.

The controller 200 may be connected to at least one nonvolatile memory device 100 through a plurality of control pins that transmit control signals (e.g., command latch enable (CLE) signals, address latch enable (ALE) signals, chip activation (CE) signals, write enable (WE) signals, read enable (RE) signals, or the like.). Also, the controller 200 may be implemented to control the nonvolatile memory device 100 using control signals (CLE, ALE, CE(s), WE, RE, or the like.). For example, the nonvolatile memory device 100 may perform a program operation/read operation/erase operation by latching a command (CMD) or an address (ADD) at an edge of a WE signal according to a CLE signal and an ALE signal. For example, during a read operation, the CE signal may be activated, the CLE signal may be activated during the command transmission period, the ALE signal may be activated during the address transmission period, and the RE signal may be toggled in a period in which data is transmitted through the data signal line (DQ). The data strobe signal DQS may be toggled at a frequency corresponding to the data input/output speed. Read data may be sequentially transmitted in synchronization with the data strobe signal (DQS).

Also, the controller 200 may be implemented to control overall operations of the storage device 32. The controller 200 may include at least one processor 210, a buffer memory 220, an error correction circuit 230, at least one nonvolatile memory interface circuit (NIF) 240, and a host interface circuit (HIF) 250.

At least one processor 210 (e.g., CPU(s)) may be implemented to control overall operation of the storage device 32. The processor 210 may perform various management such as manages cache/buffer management, firmware management, garbage collection management, wear leveling management, data deduplication management, read refresh/reclaim management, bad block management, multi-stream management, mapping management between host data and nonvolatile memory, quality of service (QoS) management, system resource allocation management, nonvolatile memory queue management, read level management, erase/program management, hot/cold data management, power loss protection management, dynamic thermal management, initialization management, and redundant array of inexpensive disk (RAID). These management operations may be implemented in terms of hardware/firmware/software.

The buffer memory 220 may be implemented to temporarily store data necessary for operation of the storage device 32. For example, the buffer memory 220 may temporarily store data to be written to the nonvolatile memory device 100 or data read from the nonvolatile memory device 100. In an example embodiment, the buffer memory 220 may be configured to be included in the controller 200. In another example embodiment, the buffer memory 220 may be disposed externally of the controller 200. Also, the buffer memory 220 may be implemented as a volatile memory (e.g., static random access memory (SRAM), dynamic RAM DRAM, synchronous RAM (SDRAM), or the like) or a nonvolatile memory (flash memory, phase-change RAM (PRAM), magneto-resistive RAM (MRAM), resistive RAM (ReRAM), ferro-electric RAM (FRAM), or the like).

The error correction circuit 230 may be implemented to generate an error correction code ECC during a program operation and may recover data using the error correction code during a read operation. That is, the error correction circuit 230 may generate an error correction code ECC for correcting a fail bit or an error bit of data received from the nonvolatile memory device 100. Also, the error correction circuit 230 may form data to which parity bits are added by performing error correction encoding of data provided to the nonvolatile memory device 100. The parity bits may be stored in the nonvolatile memory device 100.

Also, the error correction circuit 230 may perform error correction decoding on data output from the nonvolatile memory device 100. The error correction circuit 230 may correct errors using parity. The error correction circuit 230 may correct an error using a low density parity check (LDPC) code, BCH code, turbo code, Reed-Solomon code, convolution code, recursive systematic code (RSC), and coded modulation such as trellis-coded modulation (TCM), and block coded modulation (BCM). When error correction is impossible in the error correction circuit 230, a read retry operation may be performed.

At least one nonvolatile memory interface circuit (NIF) 240 may exchange data through a plurality of pins described above in at least one nonvolatile memory device 100. The nonvolatile memory interface circuit 240 may transmit data to be written in the nonvolatile memory 100 to the nonvolatile memory 100 or may receive data read from the nonvolatile memory 100. The memory interface circuit 240 may be implemented to comply with standard protocols such as JEDEC Toggle or ONFI.

The host interface circuit (HIF) 250 may be implemented to provide interface functions with the host device 21. The host interface circuit 250 may be implemented to transmit packets to and receive packets from a host. A packet transmitted from the host to the host interface circuit 250 may include a command or data to be written to the nonvolatile memory 100. A packet transmitted from the host interface circuit 250 to the host may include a response to a command or data read from the nonvolatile memory 100.

In an example embodiment, the host interface circuit (HIF) 250 may be formed on a first die, and the other components 210, 220, 230, and 240 may be formed on a second die. Here, the first die and the second die may be implemented to communicate with each other through a chiplet interface. Each of the other components 210, 220, 230, and 240 may communicate with each other using a chiplet interface. For example, the other components 210, 220, 230, and 240 may be connected to a system bus supporting a chiplet interface. Here, the system bus may be an advanced interface bus (AIB). The first die and the second die may be implemented to perform mutual authentication in the manufacturing process as described above.

The controller 200 may further include an encryption device to improve information protection. The encryption device may perform at least one of an encryption operation and a decryption operation on data input to the controller 200 using a symmetric-key algorithm. The encryption device may perform encryption and decryption of data using advanced encryption standard (AES) algorithm. The encryption device may include an encryption module and a decryption module. In an example embodiment, an encryption device may be implemented in terms of hardware/software/firmware. The encryption device may perform a self-encryption disk (SED) function or a trusted computing group (TCG) security function. The SED function may store encrypted data in the nonvolatile memory device 100 using an encryption algorithm or may decrypt encrypted data from the nonvolatile memory device 100. The encryption/decryption operations may be performed using an internally generated encryption key. The TCG security function may provide a mechanism enabling access control to user data of the storage device 100. For example, the TCG security function may perform an authentication procedure between an external device and the storage device 100. In an example embodiment, the SED function or the TCG security function may be optionally selected.

In the controller 200 illustrated in FIG. 10, the host interface circuit 250 and the other components 210, 220, 230, and 240 may be formed on different dies. However, an example embodiment thereof is not limited thereto, and components in the controller may be formed on a sub-silicon board in various combinations.

Figure 11:
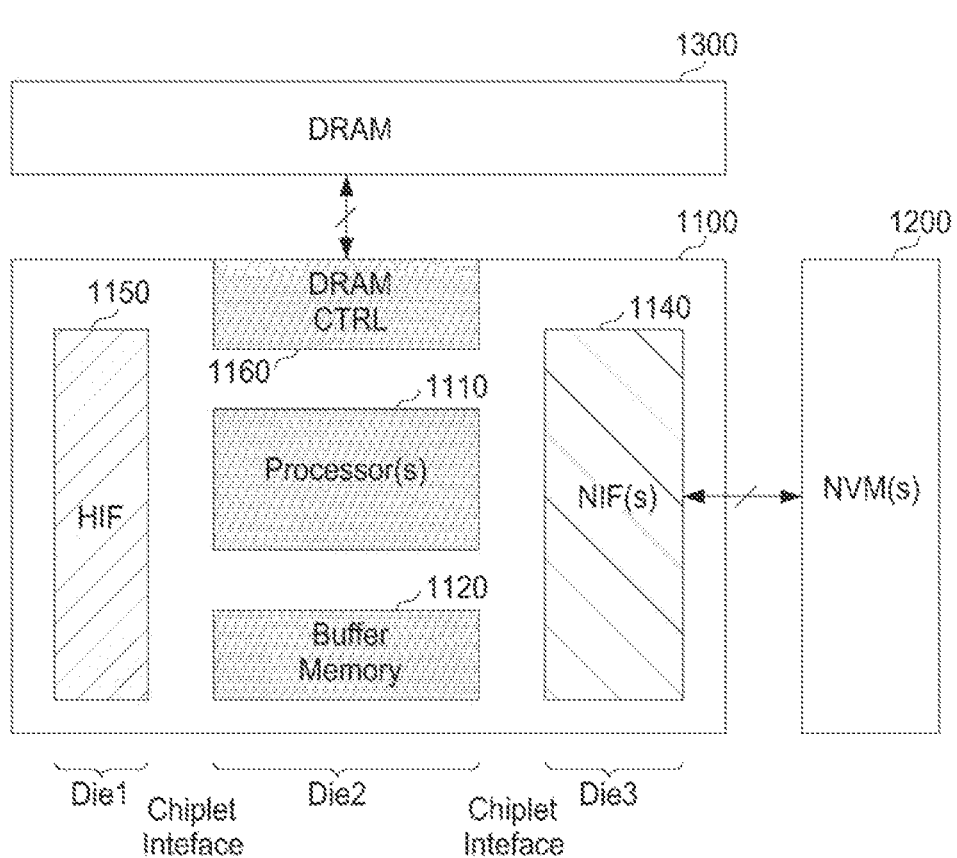
FIG. 11 is a diagram illustrating a storage device according to another example embodiment of the present disclosure.

FIG. 11 is a diagram illustrating a storage device 1000 according to another example embodiment. Referring to FIG. 11, the storage device 1000 may include a controller 1100 in which internal components are disposed in three dies.

The controller 1100 may include a host interface circuit 1150 positioned on the first die Die1, a processor 1110*a* positioned on the second die Die2, a buffer memory 1120*a*, and a volatile memory controller 1160*a*, and a nonvolatile memory interface circuit 1140*a* positioned on the third die Die3. Here, the first die Die1, the second die Die2, and the third die Die3 may be implemented as different sub-silicon boards. In an example embodiment, the first die Die1, the second die Die2, and the third die Die3 may communicate with each other through a chiplet interface (e.g., UCIe). Also, each of the first to third dies may be implemented to perform mutual authentication in the manufacturing process.

In FIG. 11, the processor 1110*a*, the buffer memory 1120*a*, and the volatile memory controller 1160*a* may be disposed on the second die Die2. However, an example embodiment thereof is not limited thereto. For example, the processor, the buffer memory, and the volatile memory controller may be disposed only on the first die Die1 or only on the third die Die3. That is, the processor, the buffer memory, and the volatile memory controller may be disposed in at least one of the first die Die1, the second die Die2, and the third die Die3 in various combinations.

Figure 12:
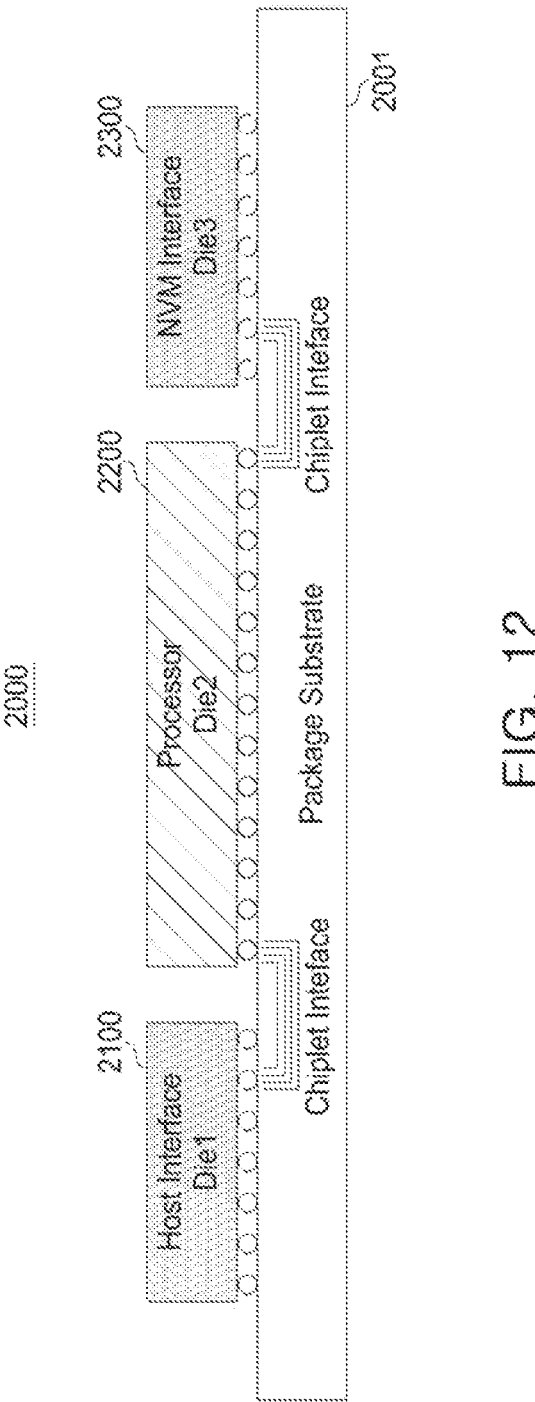
FIG. 12 is a diagram illustrating a controller package according to another example embodiment of the present disclosure.

FIG. 12 is a diagram illustrating a controller package 2000 according to another example embodiment. Referring to FIG. 12, the controller package 2000 may include a package substrate 2001, a first die 2100, a second die 2200, and a third die 2300.

The first die 2100 may include a host interface circuit. In an example embodiment, the first die 2100 may be configured as a sub-silicon board disposed on the package substrate 2001. The second die 2200 may include a processor. In an example embodiment, the second die 2200 may be configured as a sub-silicon board disposed on the package substrate 2001. The third die 2300 may include a nonvolatile memory interface circuit. In an example embodiment, the third die 2300 may be configured as a sub-silicon board disposed on the package substrate 2001.

In an example embodiment, the first die 2100 and the second die 2200 may be connected to each other based on a chiplet interface. In an example embodiment, the second die 2200 and the third die 2300 may be connected to each other based on a chiplet interface.

The example embodiment may be applicable to the process of manufacturing a high bandwidth memory (HBM) which provides a memory interface for three-dimensional (3D)-stacked synchronous dynamic random-access memory (SDRAM).

Figure 13:
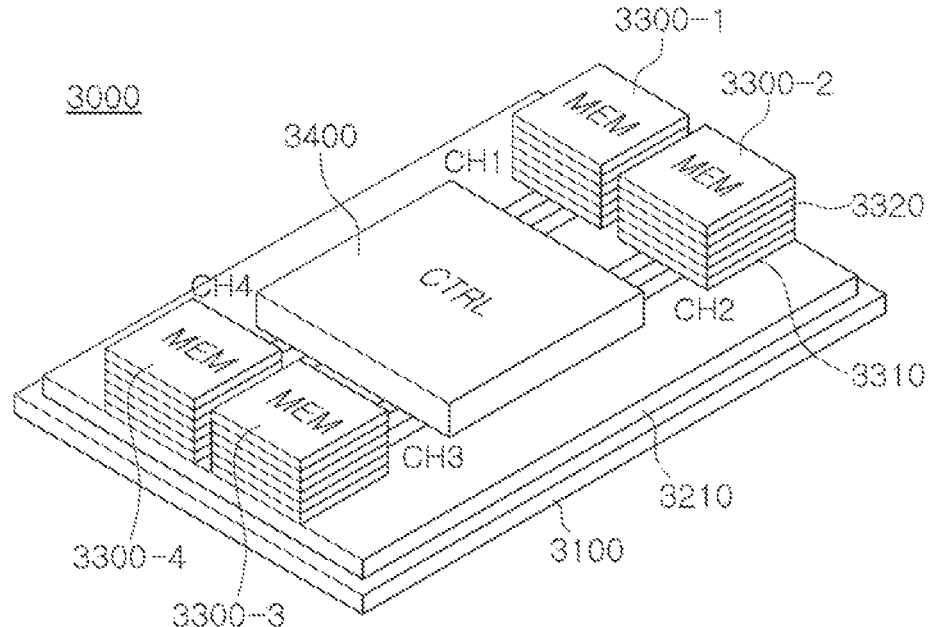
FIG. 13 is a diagram illustrating a memory system according to another example embodiment of the present disclosure.

FIG. 13 is a diagram illustrating a memory system 3000 according to another example embodiment. Referring to FIG. 13, the memory system 3000 may include a plurality of memory modules 3300-1, 3300-2, 3300-3, and 3300-4 and a controller (CTRL) 3400. In an example embodiment, an interposer 3200 may be optionally further provided on the package substrate 3100.

The memory system 3000 may be implemented to be included in a personal computer (PC) or a mobile electronic device. The mobile electronic device may include a laptop computer, a mobile phone, a smartphone, a tablet PC, personal digital assistant (PDA), enterprise digital assistant (EDA), a digital still camera, a digital video camera, and a portable multimedia player (PMP), personal navigation device or portable navigation device (PND), handheld game console, mobile internet device (MID), a wearable computer, Internet of Things (IoT) device, Internet of Everything (IoE) device, or a drone.

Each of the memory modules 3300-1, 3300-2, 3300-3, and 3300-4 may be implemented to be mounted on a package substrate 3100 such as a printed circuit board. Also, each of the memory modules 3300-1 to 3300-4 may be connected to the controller 3400 through the channels CH1 to CH4 and may be implemented with a chip on chip (CoC).

Also, each of the memory modules 3300-1 to 3300-4 may include a buffer chip 3310 and at least one memory chip 3320 (MEM). Here, the buffer chip 3310 and at least one memory chip 3320 may be connected to each other by a through silicon via (TSV).

The buffer chip 3310 may be implemented to perform a buffering function for data of the memory chip 3320. Also, the buffer chip 3310 may be implemented to perform a training operation on the memory chip 3320.

The memory chip 3310 (MEM) may be implemented as a volatile memory device or a nonvolatile memory device. In an example embodiment, the volatile memory device may be implemented as random access memory (RAM), dynamic RAM (DRAM), static RAM (SRAM), or low power double data rate (LPDDR) DRAM. In an example embodiment, a nonvolatile memory device may be implemented as an electrically erasable programmable read-only memory (EPROM), a NOAH flash memory, a NAND flash memory, a magnetoresistive random access memory (MRAM), a spin transfer torque (STT)-MRAM, a ferroelectric RAM (Fe-RAM), a phase change RAM (PRAM), resistive RAM (RRAM), nanotube RRAM, polymer RAM (PoRAM), nano floating gate Memory (NFGM), holographic memory, molecular electronics memory device, or insulator resistance change memory.

In an example embodiment, each of the memory modules 3300-1, 3300-2, 3300-3, and 3300-4 may be implemented as a high bandwidth memory (HBM). The number of memory modules 3300-1, 3300-2, 3300-3, and 3300-4 illustrated in FIG. 13 is not limited thereto.

The controller (CTRL) 3400 may be implemented to control the memory modules 3300-1, 3300-2, 3300-3, and 3300-4 connected to the channels, respectively. In an example embodiment, the controller 3400 may be implemented as a system on chip (SoC), an application processor (AP), a mobile AP, a chipset, or a set of chips. The controller 1400 may include a random access memory (RAM), central processing unit (CPU), graphics processing unit (GPU), neural processing unit (NPU), or modem. In an example embodiment, controller 3400 may perform modem functions and AP functions.

Also, the controller 2400 may be implemented to control the memory chip 3310 to read data stored in the memory chip 3310 or to write data to the memory chip 3310. The controller 3400 may control a write operation or a read operation for the memory chip 3320 by providing commands and addresses to the memory chip 3310 in synchronization with the clock signal. Also, data may be transmitted and received between the controller 3400 and the memory chip 3320 in synchronization with the data transfer clock.

In an example embodiment, in the process of manufacturing each of the plurality of memory modules 3300-1, 3300-2, 3300-3, and 3300-4 of the memory system 3000, when memory chips are stacked, mutual authentication operation may be performed. Also, in the process of manufacturing the controller (CTRL) 3400, mutual authentication operation may be performed by a chiplet (that is, a die) unit. Also, the mutual authentication operation may be performed in the process of packaging the memory modules 3300-1, 3300-2, 3300-3, and 3300-4 and the controller 3400.

The example embodiments may be applicable to various memory modules. For example, the memory modules be implemented as single in-line memory module (SIMM), dual in-line memory module (DIMM), small-outline DIMM (SODIMM), unbuffered DIMM (UDIMM), fully-buffered DIMM (FBDIMM), rank-buffered DIMM (RBDIMM), mini-DIMM, micro-DIMM, registered DIMM (RDIMM), or load-reduced DIMM (RDIMM).

The device described above may be implemented with hardware components, software components, and/or a combination of hardware components and software components. For example, the device and components described in an example embodiment may be implemented using one or more general-purpose or special-purpose computers such as a processor, a controller, an arithmetic logic unit (ALU), a digital signal processor, a microcomputer, a field programmable gate array (FPGA), and a programmable logic unit (PLU), a microprocessor, or any other device which may execute instructions and respond. A processing device may execute an operating system (OS) and one or more software applications running on the operating system. Also, a processing device may access, store, manipulate, process and generate data in response to the execution of software. For ease of description, a single processing device may be used, but the processing device may include a plurality of processing elements or a plurality of types of processing elements. For example, a processing device may include a plurality of processors or a processor and a controller. Also, other processing configurations, such as parallel processors, may be possible.

Software may include a computer program, codes, instructions, or a combination of one or more thereof, and may configure the processing device to operate as desired or to instruct the processing device independently or collectively. Software and/or data may be embodied in any type of machine, component, physical device, virtual equipment, computer storage medium or device to be interpreted by or to provide instructions or data to a processing device. Software may be distributed over networked computer systems and may be stored or executed in a distributed manner. Software and data may be stored on one or more computer-readable recording media.

According to the aforementioned example embodiments, by enabling mutual authentication between dies in the manufacturing process, the multi-chip and the method of manufacturing the same may assure die reliability.

While the example embodiments have been illustrated and described above, it will be configured as apparent to those skilled in the art that modifications and variations could be made without departing from the scope of the present disclosure as defined by the appended claims.

What is claimed is:

1. A method of verifying authentication of a multi-chip comprising a first die, a second die, and a third die, the method comprising:

connecting the second die to the first die before generating a first authentication certificate;

generating the first authentication certificate in the first die based on a first private key of the first die;

verifying the first authentication certificate in the second die based on a first public key of the first die that is selected from a plurality of public keys stored in the second die, which comprises the first public key and a third public key of the third die;

connecting the third die to the second die before generating a second authentication certificate;

generating the second authentication certificate in the second die based on a second private key of the second die; and verifying the second authentication certificate based on a second public key of the second die that is selected from a plurality of public keys stored in the third die, which comprises the first public key and the second public key;

generating a third authentication certificate in the third die using a third private key of the third die; and verifying the third authentication certificate in the first die using the third public key selected from a plurality of public keys stored in the first die, which comprises the second public key and the third public key.

2. The method of claim 1, wherein the first die, the second die, and the third die respectively comprise a first authentication circuit, a second authentication circuit, and a third authentication circuit, which are configured to perform mutual authentication based on interactions among the first die, the second die, and the third die.

3. The method of claim 1, further comprising:

storing the first private key of the first die, the second public key of the second die, and the third public key of the third die in a wafer of the first die;

storing the first private key of the second die, the second public key of the first die, and the third public key of the third die in a wafer of the second die; and storing the third private key of the third die, the first public key of the first die, and the second public key of the second die in a wafer of the third die.

4. The method of claim 1, wherein each of the first die, the second die, and the third die stores a private key of a corresponding die and a public key of at least one other die in a read only memory (ROM).

5. The method of claim 1, wherein each of the first die, the second die, and the third die stores a private key of corresponding die and a public key of at least one other die in a one-time programming memory (OTP) in a post-process.

6. The method of claim 1, wherein wherein the connecting of the second die to the first die comprises stacking the second die on the first die before generating the first authentication certificate; and wherein the connecting of the third die to the second die comprises stacking the third die on the second die before generating the second authentication certificate.

7. The method of claim 1, wherein the first die, the second die, and the third die comprises at least one of an analog chip, a digital chip, a memory chip, and a nonvolatile memory chip.

8. The method of claim 1, further comprising:

testing a function of at least one of the first die, the second die, and the third die after performing mutual authentication between the at least one and at least another one of the first die, the second die, and the third die.

9. The method of claim 1, wherein the first die, the second die, and the third die communicate with each other via a chiplet interface.

10. A method of verifying authentication of a multi-chip, the method comprising:

before generating a first authentication certificate, connecting a first chip storing a first private key to a second chip storing a first public key that is paired with the first private key;

performing a first authentication operation between the first chip and the second chip by generating the first authentication certificate by signing with the first private key and verifying the first authentication certificate with the first public key;

testing at least one function of the second chip by the first chip;

connecting the second chip storing a second private key to a third chip storing a second public key that is paired with the second private key;

before generating a second authentication certificate, performing a second authentication operation between the second chip and the third chip by generating the second authentication certificate by signing with the second private key and verifying the second authentication certificate with the second public key;

testing at least one function of the third chip by the second chip;

connecting the third chip storing a third private key to the first chip storing a third public key that is paired with the third private key;

performing a third authentication operation between the third chip and the first chip by generating a third authentication certificate by signing with the third private key and verifying the third authentication certificate with the third public key; and testing at least one function of the first chip by the third chip.

11. The method of claim 10, wherein the first chip, the second chip, and the third chip respectively comprises a first authentication circuit, a second authentication circuit, and a third authentication circuit configured to perform mutual authentication based on interactions among the first chip, the second chip, and the third chip.

12. The method of claim 10, wherein the testing of the at least one function of the second chip and the testing of the at least one function of the third chip are conducted by the first chip.

13. The method of claim 10, wherein the testing of the at least one function of the second chip is conducted by the first chip, and wherein the testing of the at least one function of the third chip is conducted by the second chip.

14. The method of claim 10, further comprising:

storing the first private key in the first chip during manufacturing of the first chip;

storing the first public key and the second private key in the second chip during manufacturing of the second chip; and storing the second public key in the third chip during manufacturing of the third chip.

15. A multi-chip comprising:

a first die;

a second die disposed on the first die and configured to communicate with the first die through a first chiplet interface;

a third die disposed on the second die and configured to communicate with the second die through a second chiplet interface, wherein the first die, the second die, and the third die are configured to perform an authentication operation by:

generating a first authentication certificate in the first die using a first private key stored in the first die and verifying the first authentication certificate in the second die using a first public key stored in the second die;

generating a second authentication certificate in the second die using a second private key stored in the second die and verifying the second authentication certificate in the third die using a second public key stored in the third die; and generating a third authentication certificate in the third die using a third private key stored in the third die and verifying the third authentication certificate in the first die using a third public key stored in the first die, and wherein the first die stores the second public key and the third public key, the second die stores the first public key and the third public key, and the third die stores the first public key and the second public key.

16. The multi-chip of claim 15, wherein the first die comprises a first authentication circuit configured to perform the authentication operation based on a first pair of the first private key and the first public key stored in the first die and the second die, respectively.

17. The multi-chip of claim 16, wherein the second die comprises a second authentication circuit configured to perform the authentication operation based on a second pair of the second private key and the second public key stored in the second die and the third die, respectively.

18. The multi-chip of claim 15, wherein the multi-chip operates as a storage device controller or a high bandwidth memory (HBM).

19. The multi-chip of claim 15, wherein the authentication operation is a mutual authentication operation that is performed based on interactions among the first die, the second die, and the third die.

\* \* \* \* \*